United States Patent
Roux et al.

(10) Patent No.: US 8,801,900 B2
(45) Date of Patent: Aug. 12, 2014

(54) STARCH COMPOSITION FOR USE IN PAPER MANUFACTURE

(75) Inventors: Rudy Roux, Douai (FR); Andreas Voigt, Mulheim (DE)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 13/992,459

(22) PCT Filed: Dec. 7, 2011

(86) PCT No.: PCT/EP2011/006140
§ 371 (c)(1),
(2), (4) Date: Jun. 7, 2013

(87) PCT Pub. No.: WO2012/076163
PCT Pub. Date: Jun. 14, 2012

(65) Prior Publication Data
US 2013/0284389 A1    Oct. 31, 2013

(30) Foreign Application Priority Data
Dec. 10, 2010  (EP) .................................... 10194577

(51) Int. Cl.
*D21F 11/00*    (2006.01)

(52) U.S. Cl.
USPC ........................................... 162/141; 162/158

(58) Field of Classification Search
USPC ............ 162/141, 158, 175; 536/104–106, 45; 527/309
See application file for complete search history.

(56) References Cited

U.S. PATENT DOCUMENTS

| | | | |
|---|---|---|---|
| 4,613,407 A | 9/1986 | Huchette et al. | |
| 6,710,175 B2 * | 3/2004 | Anderson et al. | 536/45 |
| 2003/0150573 A1 * | 8/2003 | Anderson et al. | 162/158 |
| 2005/0161182 A1 * | 7/2005 | Capwell | 162/158 |
| 2006/0254737 A1 | 11/2006 | Anderson et al. | |
| 2010/0155338 A1 | 6/2010 | Ladret et al. | |

FOREIGN PATENT DOCUMENTS

WO    97/46591 A1    12/1997

\* cited by examiner

*Primary Examiner* — Mark Halpern

(57) ABSTRACT

The starch composition comprises a cationic, cross-linked starch that is partly swollen and partly gelatinized. It has a gelatinization coefficient gT smaller than 0.7 with T the jet cooking temperature. The starch composition suitably comprises a wheat starch or a blend of a wheat starch and another starch, for instance a root or tuber starch.

10 Claims, No Drawings

STARCH COMPOSITION FOR USE IN PAPER MANUFACTURE

CROSS-REFERENCE TO RELATED APPLICATIONS

This application is a national phase application of international application PCT/EP2011/006140, filed Dec. 7, 2011, which application claims priority to European Application 10194577.2, filed Dec. 10, 2010, which applications are hereby incorporated by reference herein in their entirety.

FIELD OF THE INVENTION

The present invention relates to cationic, cross-linked and cooked starch compositions for use as an additive in paper manufacturing. It further relates to a preparation method thereof, and to the use thereof.

BACKGROUND OF THE INVENTION

Cationic starch compositions have been long applied as an additive in paper manufacturing.

For instance, U.S. Pat. No. 6,451,170 discloses a process for obtaining such compositions. The starch can be selected from a variety of starches, including corn, potato, tapioca, wheat, rice, etc. It is preferably a corn starch, and typically a dent corn starch (column 5, line 31). The starch is typically cross-linked with a cross-linker which is reactive with the hydroxyl functionality of the starch. The cross-linker permits a greater range in particle sizes compared to non-cross-linked starch. The starch compositions are desirably cationic starches that retain a positive charge when dissolved in water. The starch preferably contains a quaternary ammonium ion, which gives enhanced flexibility in pH. Frequently, such quaternary ammonium-containing starch is derivatized by etherification of hydroxyl groups with an appropriate etherifying agent, such as (3-chloro-2 hydroxypropyl) trimethyl ammonium chloride, the methyl chloride quaternary salt of N-(2,3-epoxypropyl) dimethylamine or N-(2,3-epoxypropyl) dibutylamine or N-(2,3-epoxypropyl)methylaniline. The starch is typically cationized to a degree of substitution (DS), as known per se, of greater than 0.005, but not greater than 0.100, preferably from 0.030 to 0.040. Cooking is thereafter applied to set the average particle size in the resulting cationic starch composition. It is herein expressed, as a general rule that an increase in cooking temperature results in a reduction of the average particle size. The cooking temperature, and other conditions thereof, such as pressure, may be tuned to arrive at a particle size of the starch that is comparable to the particle size of paper fibers.

Various types of starch have been proposed as an alternative to the usual corn, waxy corn or potato starches. US2006/0254737 proposes the use of blends of cationic starches. EP0139597 describes bulk paper additives made from mixtures of at least one cationic cereal starch and at least one cationic tuber starch. Surprisingly and unexpectedly, these are capable of exhibiting synergies, in particular in terms of physical and retention characteristics. US2006/0225855 specifies that potato starch is currently the most applied starch for use in paper manufacturing. Its use is preferred over corn starch, and wheat starch. However, the supply of potato starch is becoming difficult, mainly because of costs of extraction and the regulations applied to them. Therefore, US2006/0255855 proposes the use of pea starch.

In addition to the choice of the type of starch, the cross-linking degree is highly relevant to its properties as an additive. EP0603727 discusses the impact of the degree of cross-linking on the properties of paper additives. The properties of corn and waxy maize starch, that are per se less than those of cationic potato starches, may be improved however with the combination of cross-linking and jet cooking (Table 5). However, there is also a maximum amount of useful cross-linking: when increasing the concentration of cross-linker from 0 to 0.02% epichlorohydrin by weight of (waxy corn) starch, the peak viscosity decreases and the viscosity breakdown upon cooking reduces to zero. Above a cross-linking degree of more than 0.02%, the cooking increases the viscosity rather than reduces it.

WO02/088188 nevertheless proposes cross-linking with as much as 3% TMF cross-linker by weight of starch. It teaches the addition of water during cross-linking so as to arrive above the equilibrium moisture. It shows that cross-linking, without cationization, may give rise to a substantial viscosity decrease. The background hereof is likely that the additional moisture is needed so as to allow a better diffusion of the TMF cross-linker through the starch. The cross-linking thereafter leads to granulates, such that the starch concentration in the water phase and therewith the viscosity decreases. Not surprisingly, Example 7 refers to filtration of a starch cake. It is however unclear how such a starch could be a good additive in the wet end of paper manufacturing. EP1360209 continues on that path by proposing the extrusion of such a very highly cross-linked starch (0.1-0.8% cross-linker)

Furthermore, the cooking conditions are relevant. EP0623727 observes that jet cooking is preferred over batch cooking, because it leads to higher calcium carbonate retention. It suggests a cooking temperature of 105 to 120° C. With high cross-linking as discussed above, incomplete gelatinization may occur during cooking. When applying that to a paper machine, dewatering turns out problematic. WO97/46591 proposes a variation thereon, which apparently works for specific applications. It proposes jet cooking of cationic (DS=0.016) and cross-linked starches at a low temperature, for instance 70° C. This low temperature is used to control the degree of swelling such that over-swelling or bursting does not occur during this cooking. Complete gelatinization is to occur only after being applied to the paper furnish and subsequently heated over dryers. Suitable thereto are a selection from the group of a blend of equal parts wheat and tapioca starch, tapioca starch or wheat starch.

This process of adding only swollen granules to the paper pulp and subsequently allowing gelatinization however does not allow a high paper production rate. The patent application states that the production rate was not lower than before, but recycled paper mills in the 1990s typically were used to produce thick paper particularly for packaging applications. Such type of paper was made on very slow machines compared to today's advanced paper mills for standard and high-quality paper. WO97/46591 also appears to admit that when stating that the paper machine speed may be improved on heavier grades of paper.

It is therefore still an object of the invention to develop alternatives for potato starches which are suitable for use in advanced paper mills. Starch compositions are used as additives in the papermaking process to improve drainage and retention, to add strength, and to improve formation properties of the paper. Drainage, or de-watering ability, is an important consideration in the manufacture of paper, because it is related to how fast a paper machine can remove water from the web. Typically, improved dewatering corresponds to higher speeds on paper machines and to higher production rates of paper. Furthermore, it is desired to increase the loading of cationic starch into the paper manufacturing without a negative impact on the paper formation, i.e. the resulting paper quality.

SUMMARY OF THE INVENTION

It is therefore an object of the invention to provide an alternative and improved starch composition, a method of preparation thereof, as well as use thereof in paper manufacturing.

This object is achieved in a starch composition comprising a cationic, cross-linked starch that is partly swollen and partly gelatinized.

The object is further achieved in a process of preparing a partially gelatinized and partially swollen cross-linked starch composition by jet cooking a cationic and cross-linked starch at a temperature in the range of 90-140° C., preferably in the range of 100-135 degrees Celsius, more preferably 110-125 degrees Celsius.

It is further achieved in the use a starch composition comprising a cationic, cross-linked starch that is partly swollen and partly gelatinized as a strengthening additive in paper manufacturing, particularly in the wet end of a paper-making machine.

This object is achieved in a starch composition comprising a cationic and cross-linked wheat starch that has been cross-linked with a diether cross-linker in an amount of 60 to 500 ppm, preferably 80 to 400 ppm, more preferably 125-350 ppm.

The object is further achieved by jet cooking at a temperature in the range of 110-140° C. a starch composition comprising a cationic and cross-linked wheat starch that has been cross-linked with a diether cross-linker in an amount of 60 to 500 ppm, preferably 80 to 400 ppm, more preferably 125-350 ppm The object is also achieved by jet cooking at a temperature above the gelatinization temperature a starch composition comprising a cationic and cross-linked wheat starch that has been cross-linked with a diether cross-linker in an amount of 60 to 500 ppm, preferably 80 to 400 ppm, more preferably 125-350 ppm The object is further achieved by partial gelatinization of a starch composition a starch composition comprising a cationic and cross-linked wheat starch that has been cross-linked with a diether cross-linker in an amount of 60 to 500 ppm, preferably 80 to 400 ppm, more preferably 125-350 ppm The object is furthermore achieved in a starch composition obtained by jet cooking at a temperature in the range of 110-140° C. a starch composition comprising a cationic and cross-linked wheat starch that has been cross-linked with a diether cross-linker in an amount of 60 to 500 ppm, preferably 80 to 400 ppm, more preferably 125-350 ppm The object is furthermore achieved in a starch composition obtained by jet cooking at a temperature above the gelatinization temperature a starch composition comprising a cationic and cross-linked wheat starch that has been cross-linked with a diether cross-linker in an amount of 60 to 500 ppm, preferably 80 to 400 ppm, more preferably 125-350 ppm The object is further achieved in a starch composition obtained by partial gelatinization of a starch composition a starch composition comprising a cationic and cross-linked wheat starch that has been cross-linked with a diether cross-linker in an amount of 60 to 500 ppm, preferably 80 to 400 ppm, more preferably 125-350 ppm.

The object is further achieved in the use of any of said starch compositions comprising a cationic, cross-linked starch as a strengthening additive in paper manufacturing, particularly in the wet end of a paper-making machine.

Surprisingly, good results for paper manufacturing have been found through the use of a starch that is partly swollen and partly gelatinized. The partial gelatinization and partial swelling is to be understand as that over-swelling and bursting has occurred during cooking but only to a certain extent. More particularly, the starch has been cooked above its gel point range.

The extent of gelatinization may be expressed with a gelatinization coefficient gT. In accordance with the invention, this coefficient is preferably smaller than 0.7 with T the jet cooking temperature. The gelatinization coefficient is defined as a ratio of two viscosity differences. The gelatinization coefficient g is specified in formula (1):

$$gT=(\eta ref-\eta jet,T)/(\eta ref-\eta final) \qquad (1)$$

wherein $\eta ref$ is the reference Brookfield viscosity, particularly after batch cooking at 96° C.; $\eta jet, T$ is the sample Brookfield viscosity after jet cooking at temperature T; and $\eta final$ is the final Brookfield viscosity after full gelatinization with jet cooking (typically at 150° C.), particularly specified as 40 mPas.

The Brookfield viscosities are suitably measured at 50° C., spindle 2, 100 rpm and wherein the starch composition is cooked at a dry solids level of 3%.

More specifically, a starch or starch blend is used that has a gelatinization coefficient g120 smaller than 0.6. Herein, the gelatinization coefficient is not used as an actual parameter of the obtained starch solution, but as a materials parameter which defines the type of starch. Preferably a starch is used with a gelatinization coefficient g120 smaller than 0.5, more preferably smaller than 0.4

Preferably, the starch is a wheat starch, which is more preferably cross-linked at a relatively high level. Starches are suitably cross-linked with di- or multifunctional reagents that form diether or diester cross-links (refered to herein as "diether or diester cross-linkers" for short). Diphosphate ester cross-links can be introduced by reaction of starch with f.i. phosphoryl chloride, sodium trimetaphosphate, sodium tripolyphosphate. Diethers cross-links can be introduced by reaction of starch with for instance glycerol diethers, such as dichloropropanol (DCP) and epichlorohydrin. Diphosphate ester cross-linkers are typically used in higher concentrations than diether cross-linkers and tend to show higher viscosities, indicative of higher molecular weights, and thus higher cross-linking degrees. Suitably, the wheat starch is cross-linked by using a diether cross-linker such as dichloropropanol. More particularly, it is used in an amount of 60 to 800 ppm, preferably in the range of 80-700 ppm, more preferably 100-500 ppm. It has been found that a cooked highly cross-linked cationic wheat starches have beneficial properties that meet the requirements for use in paper manufacture. This is surprising, as wheat starch typically does not have sufficient quality for use in the wet end of paper manufacture. Particularly, the white water turbidity of cross-linked and non cross-linked wheat starches is far behind that of cross-linked and non-cross-linked cationic potato starch, which is a commercially available reference. In one embodiment a very high amount of cross-linker is used, for instance between 250 and 400 ppm. Use of the resulting starch is particularly beneficial in combination with a high addition of 1.0% or more.

Surprisingly, the partially swollen and partially gelatinized cationic wheat or wheat-based starches turn out to have beneficial properties for use in paper manufacturing, particularly when cooked at moderate temperatures. These wheat starches have a higher viscosity than the reference. Their ash retention is comparable to the reference. Moreover, the loading of the inventive wheat starch into the paper composition may be increased. Therewith, the ash retention and the white water turbidity of the resulting paper compositions can be significantly improved.

Blends of wheat starch and other starch have been found to have even better properties than wheat starch as such. Such blends will hereinafter also be referred to as wheat-based starch. The term 'wheat-based starch' as used herein is a starch blend comprising 1 to 99% wheat starch, preferably at least 25% wheat starch and at most 90% wheat starch. Preferably the starch blend comprises at least 40% of wheat starch, more preferably 45-80%. The percentages herein relate to weight percentages based on the total amount of starch. The blend suitably comprises another starch, which may be for instance a wheat starch, a corn starch, a potato starch, a pea starch, a tapioca starch. A root or tuber starch is preferred. Such starches, such as potato starch, have another structure than wheat starch, as for instance visible in the ratio of amylose and amylopectin. The other starch is preferably cationic and cross-linked. Cross-linking and/or cationization of the blended starches may be carried out jointly or separately. Separate cross-linking appears preferable, so as to maintain certain properties of the wheat starch.

In a further embodiment, the use of the cooked composition of the invention is carried out with a higher loading of cationic starch than previously applied. Typically, when using starch in the wet-end of paper manufacture, e.g. by adding it to cellulosic pulp, 0.5% of starch is added. In this embodiment, the loading is for instance 0.8-2% 0.8-1.4%. These addition percentages are weight percentages based on head box furnish dry solids. The maximum loading to the cellulosic pulp is determined by the Zeta-potential of the paper composition of mixed starch and pulp: the maximum is reached when the zeta-potential approaches zero, i.e. the isoelectric point. The charge of any further added cationic starch cannot be compensated by the negative charge of the pulp. Hence, further addition of starch does not lead to additional electrostatic attraction between starch and pulp. Hence, any further added starch will typically not improve paper quality. It has been found that the zeta potential of a paper composition of wheat starch or wheat-based starch is comparatively negative (large negative charge). This therefore allows the integration of more starch. Increasing the starch loading has been found to increase the ash retention. Ash retention is a measure for the paper structure. Particularly for wheat-based starch, an increased starch loading also increases the paper strength, as measured by the breaking length.

DETAILED DESCRIPTION OF ILLUSTRATED EMBODIMENTS

The present disclosure is directed to cationic cross-linked starch comprising compositions, and the use thereof in the preparation of cellulosic webs such as paper products, coating compositions and paints. The starch compositions may comprise a single starch or a mixture of starches. The starch compositions of the present disclosure are not inclusive of naturally occurring impurities, residual or otherwise. The present invention is also directed to cellulosic webs, such as paper products, coating compositions and paints, that are produced using the starch compositions described herein.

In producing the cationic cross-linked starch, any conventional method may be used such as the following. A starch, as described therein, is cationized by reacting the starch with any cationizing agent. Exemplary of the cationizing agents are reagents having amino ions, imino ions, sulfonium ions, phosphonium ions, or ammonium ions and mixtures thereof. The cationizing reaction may be carried out in any conventional manner such as reacting the starch in an aqueous slurry form with the cationizing reagent, usually in the presence of an activating agent such as sodium hydroxide. Suitably, use is made of a semi-dry process where the starch is reacted with the cationizing agent in the presence of an activating agent such as sodium hydroxide, in a limited amount of water.

Examples of preferred cationizing agents are those having an ammonium ion, and more preferably, where the ammonium ion is a quaternary ammonium ion. A particularly useful cationizing agent is (3-chloro-2-hydroxypropyl) trimethylammonium chloride. The degree of substitution is suitably in the range of 0.02 to 0.1, for instance 0.03 to 0.07

The starch, as described herein, is cross-linked by reacting the starch with any cross-linking agent. The reaction is carried out using any known manner for cross-linking a product. The cross-linking component, suitable for use herein, includes, but is not limited to, a multi-functional etherifying agent, a multi-functional esterifying agent, mixtures thereof, and the like. Specific examples of suitable cross-linking agents include, but are not limited to, epichlorohydrin, a dicarboxylic acid, phosphorous oxychloride, an alkali earth metal salt of trimetaphosphate, a phosphorous oxyanhydride that is a metal salt of a linear polyphosphate, a linear mixed anhydride, a polyamine polyepoxide resin, mixtures thereof and the like. The cross-linking reaction may be carried out in any conventional manner such as reacting the starch in an aqueous slurry form with the cross-linking agent usually in the presence of an activating agent such as sodium hydroxide. Another cross-linking process that may be used is a semi-dry process where the starch is reacted with the cross-linking reagent in the presence of an activating agent such as sodium hydroxide, in a limited amount of water. The starch may be cationized and cross-linked in any order, in producing the cationic cross-linked starch. Preferably the cationization and the cross-linking occur simultaneously.

In more detail, the cationic starch may be further modified or may be further unmodified. The further modification may be a chemical, physical or enzymatic modification.

Chemical modification includes any treatment of a starch with a chemical that results in a modified starch. Within chemical modification are included, but not limited to, depolymerisation of a starch, oxidation of a starch, reduction of a starch, etherification of a starch, esterification of a starch, nitrification of a starch, defatting of a starch, grafting of a starch by interpolymerisation of a starch with one or more monomers, and the like. Chemically modified starches may also be prepared by using a combination of any of the chemical treatments. Examples of chemically modified starches include the esterification or etherification of starch, for instance in a reaction with anhydride, such as octenyl succinic anhydride with starch to produce a hydrophobic starch; the etherification, for instance with ethylene oxide or propylene oxide, to produce hydroxyalkylated starch; the reaction of hypochlorite with starch to produce an oxidized starch; the reaction of an acid with starch to produce an acid depolymerized starch; defatting of a starch with a solvent such as methanol, ethanol, propanol, methylene chloride, chloroform, carbon tetrachloride and the like, to produce a defatted starch.

Physically modified starches are any starches that are physically treated in any manner to provide physically modified starches. Within physical modification are included, but not limited to, thermal treatment of the starch in the presence of water, thermal treatment of the starch in the absence of water, fracturing the starch granule by any mechanical means, pressure treatment of starch to melt the starch granules, and the like. Physically modified starches may also be prepared by using a combination of any of the physical treatments. Examples of physically modified starches include the thermal treatment of starch in an aqueous environment to cause the starch granules to swell without granule rupture; the thermal treatment of anhydrous starch granules to cause polymer rearrangement; fragmentation of the starch granules by mechanical disintegration; and pressure treatment of starch granules by means of an extruder to cause melting of the starch granules.

Enzymatically modified starches are any starches that are enzymatically treated in any matter. With enzymatic modification are included, but not limited to, the reaction of an alpha amylase with starch, the reaction of a protease with starch, the reaction of a lipase with starch, the reaction of a phosphorylase with starch, the reaction of an oxidase with starch, and the like. Enzymatically modified starches may be prepared by using a combination of any of the enzymatic treatments. Examples of enzymatic modification of starch include the reaction of alpha-amylase enzyme with starch to produce a depolymerized starch; the reaction of a protease enzyme with starch to produce a starch with reduced protein content; the reaction of a lipase enzyme with starch to produce a starch with reduced lipid content the reaction of a phosphorylase enzyme with starch to produce an enzyme modified phosphated starch; and the reaction of an oxidase enzyme with starch to produce an enzyme oxidized starch.

EXAMPLES

Several starches were used in experiments leading to the present invention. Table 1 provides an overview of these starches. Cross-linking and cationization occurred in a semi-dry process in the manner known in the art, for instance from US2009/0044922, example 2. The degree of substitution (DS) and the amount of organic cross-linker, such as 2,3-epoxypropyl-N,N,N-trimethyl ammonium chloride in combination with 1,3-dichloropropanol are specified in Table 1. Table 2 provides an overview of certain blends of potato starch and wheat starch in accordance with the invention. In addition, some commercially available starches for Cargill were investigated for reference purposes. S01 is a non-cross-linked corn starch, commercially available under the name C*Size 03453 from Cargill. S11 is a cross-linked corn starch, commercially available under the name C*Bond HR 05946 from Cargill. S12 is a cationic, cross-linked corn starch, commercially available under the name Altra-Charge 140 from Cargill. S02 is a non-cross-linked wheat starch, commercially available from Cargill under the trade name C*Gel 20006. S31 is a cross-linked wheat starch commercially available from Cargill under the trade name C*Gum 25700

TABLE 1 overview of wheat and potato starches according to the invention

| Name | starch type | Amount of cross-linker (ppm) | Degree of substitution (DS), cationic |
|---|---|---|---|
| S21 | cross-linked potato | 18 | 0.042 |
| S22 | cross-linked potato | 130 | 0.038 |
| S23 | cross-linked potato | 200 | 0.040 |
| S32 | cross-linked wheat | 150 | 0.043 |
| S33 | cross-linked wheat | 220 | 0.043 |
| S34 | cross-linked wheat | 300 | 0.043 |

TABLE 2 overview of starch blends

| Nr | Blend type | Potato starch | Wheat |
|---|---|---|---|
| B4 | 25% potato, 75% wheat | S22 | S33 |
| B10 | 25% potato, 75% wheat | S23 | S33 |
| B11 | 50% potato, 50% wheat | S23 | S34 |

Example 1

Several of the starches were subjected to cooking, both with jet cooking at 120° C., 130° C. and 140° C. and batch cooking at 96° C. Residence time of jet cooking was 1 minute in all examples. Batch cooking is carried out in a hot water bath of 96° C. and stirring speed of 250 rpm during 30 minutes. Use is made herein of starch powder that is filled up with distilled water and mixed properly to a homogeneous slurry. Subsequently, the Brookfield viscosity was measured at 100 rpm at 50° C., in a set of temperatures from 80° C. to 30° C. The cooked starches were standardized to 3% dry solids. Jet cooking occurred with a conventional laboratory jet cooker, with a slurry concentration of 4.5%. Results are shown in Table 3.

Both the non-cross-linked corn starch S01 and the non-cross-linked wheat starch S02 have low viscosity values, wherein the batch cooked value is higher than the jet cooked value. The values for wheat starch lie below those of corn starch, and the difference in viscosity between jet cooking and batch cooking is larger for the corn starch S10 than for the wheat starch S13. Cross-linking results therein that this difference in viscosity between jet cooking and batch cooking is inversed, as shown by S11. Microscopic inspection shows that the cross-linked corn starch does not contain significant amounts of incompletely gelatinized starch, i.e. the starch is almost completely gelatinized, in line with the low viscosities. The viscosity obtained after batch cooking appears to represent here the state of completely gelatinized. Use of a corn starch that is both cross-linked and cationized results in much higher viscosities when jet cooking at 120° C., as is apparent from S12. Jet cooking at higher temperatures results however in a tremendous decrease in the viscosity. Microscopic observation shows that both at 120° C. and at 130° C. the starch is completely gelatinized.

Cationic and cross-linked potato starches provide another picture than the corn starches. The viscosity after batch cooking is much higher than after jet cooking. The difference in viscosity between batch cooking and jet cooking increases with the degree of cross-linking, suggesting that this difference is a parameter for cross-linking. Microscopic inspection reveals that the cooked potato starch S21 with a low cross-linking degree is substantially completely gelatinized. The cooked potato starch S22 is however only partially gelatinized.

Wheat starches in accordance with the invention show a viscosity behavior that is again different. Based on the comparison between native corn and native wheat starches S01 and S02, one would expect for wheat starch a similar viscosity profile as that of corn starch. While the viscosity after jet cooking at 120° C. is indeed somewhat lower for the wheat starches than for the cationic and cross-linked corn starch S12, the viscosity reduces less quick upon increase of the cooking temperature. Microscopic inspection reveals that the cross-linked and cationic wheat starches that are jet cooked, even at 140° C., are merely partially gelatinized, and still partially swollen. Moreover, upon increase of the cross-linking density, the viscosity after cooking decreases rather than increases. This result appears in line with the findings in EP0603727 for cross-linked and cationic waxy corn starch. A waxy corn starch primarily comprises amylopectin, whereas a wheat starch is an amylose containing type of starch.

The results for wheat starches are moreover clearly distinct from those for cross-linked, cationic potato starches. No increase in viscosity after batch cooking is found. Thus even though the microscopic inspection reveals a similar phenomenon for cross-linked, cooked potato starches as for cross-linked, cooked wheat starches, the behavior in relation after batch cooking is rather different. It is therefore believed that the process of cross-linking leads to a result in wheat starches different from that in potato starches.

Table 3 moreover shows results for certain blends of wheat and potato starches, both of which have been found to lead to partial gelatinization only. Both blends shown in Table 3 comprise 75% wheat starch and 25% potato starch. It turns out that the viscosity profile of these blends substantially correspond to the viscosity profiles of 100% wheat starch. This holds for the absolute viscosity at 50° C., and also the temperature profile of viscosity change. This temperature profile for cationic and cross-linked wheat starch S33, jet cooked at 120° C. runs from 100 to 200 mPas for a temperature range from 80° C. to 30° C. for the starch S33. The temperature profile for cationic and cross-linked potato starch S22, jet cooked at 120° C. runs from 200 to 450 mPas for a temperature range from 80° C. to 30° C. The temperature profile for the blends B4, B10, jet cooked at 120° C., runs from 120 to 230 mPas for a temperature range from 80° C. to 30° C. Moreover, the blends behave similarly to the wheat starch in that no major difference in viscosity is found between jet cooking and batch cooking. Furthermore, the increase in cross-linking density of B10 versus B4 (of the potato starch) does not lead to an increase in viscosity but to a reduction thereof.

TABLE 3

Brookfield viscosity at 50° C. (measured at 100 rpm, spindle 2 in [mPas] for different cooking temperatures, with 3% dry solids)

| starch type | Jet cooking | | | Batch cooking |
| --- | --- | --- | --- | --- |
| | 120° C. | 130° C. | 140° C. | 96° C. |
| S01 | 44 | | | 90 |
| S11 | 63 | 42 | — | 470 |
| S12 | 206 | 76 | 60 | |
| S02 | 39 | | | 56 |
| S21 | 94 | 57 | 41 | 420 |
| S22 | 280 | | | 1210 |
| S23 | 300 | | | 1250 |
| S31 | 44 | | | 34 |
| S32 | 178 | 100 | 49 | 160 |
| S33 | 168 | 116 | 58 | 120 |
| S34 | 138 | 116 | 61 | 90 |
| B4 | 180 | | | 240 |
| B10 | 170 | | | 176 |

Based on these values a gelatinization coefficient can be defined. The gelatinization coefficient defines how far gelatinization has progressed for a cross-linked starch. Typically, the high shear in jet cooking is believed to result in physical destruction of starch granules and to lead to increased solubilisation of the bigger cross-linked molecules, particularly in case of cross-linking with diether cross-linkers. Full pasting and gelatinization is understood to result in a final Brookfield viscosity at 50° C., spindle 2, 100 rpm of 40 mPas. The viscosity difference for a starch composition after jet cooking and batch cooking is thus a useful measure to specify the gelatinization process. This difference may be converted into a coefficient by division of the viscosity difference after batch cooking and the minimum. The gelatinization coefficient g is therewith $$gT = (\eta\mathrm{ref} - \eta\mathrm{jet}, T)/(\eta\mathrm{ref} - \eta\mathrm{final}) \quad (1)$$

wherein ηref is the reference Brookfield viscosity after batch cooking at 96° C.; ηjet, T is the sample Brookfield viscosity after jet cooking at temperature T; and ηfinal is the final Brookfield viscosity after full gelatinization with jet cooking (typically at 150° C.); and wherein the Brookfield viscosities are measured at 50° C., spindle 2, 100 rpm and wherein the starch composition is cooked at a dry solids level of 3%.

TABLE 4 gelatinization coefficients for the starches jet cooked at 120° C.

| starch type | Difference between Jet cooking at 120° C. and batch cooking at 96° C. | Difference between batch cooking at 96° C. and minimum viscosity of 40 mPas | Gelatinization coefficient g120 |
| --- | --- | --- | --- |
| S01 | 46 | 50 | 0.92 |
| S02 | 17 | 16 | 1.06 |
| S21 | 326 | 380 | 0.85 |
| S22 | 930 | 1170 | 0.80 |
| S32 | −18 | 120 | −0.15 |
| S33 | −48 | 80 | −0.60 |
| S34 | −48 | 50 | −0.96 |
| B4 | 60 | 200 | 0.30 |
| B10 | 6 | 136 | 0.04 |

TABLE 5 gelatinization coefficient gT for wheat starches jet cooked at different temperatures.

| starch type | g120 | g130 | g140 |
| --- | --- | --- | --- |
| S32 | −0.15 | 0.5 | 0.93 |
| S33 | −0.60 | 0.05 | 0.78 |
| S34 | −0.96 | −0.52 | 0.58 |

Example 2

Further Brookfield viscosities were measured for the starches of the invention at 70° C. These were compared with the Brookfield viscosity reported in WO97/46591 for wheat starch that is merely swelling without any over-swelling and bursting. The reported values at 70° C. for the Brookfield viscosity (3.0% starch solids, Spindle 2, 100 rpm) are 30 mPas for the cross-linked, cationic and swollen wheat starch and 40 mPas for the cross-linked, cationic and swollen potato starch. Table 6 reports values for those starches jet cooked at 120° C. as specified in Table 1 and 2, of which the Brookfield viscosity is measured at 70° C., 100 rpm, spindle 2. It is clear from this comparison that the starches in accordance with the invention and those of S12, S21, S22 have a much higher viscosity than those of WO97/46591. This is clearly based on the gelatinization that has taken place.

TABLE 6

Brookfield viscosities at 70° C. after jet cooking at 120° C.

| | Starch type | | | | | | | | | | |
|---|---|---|---|---|---|---|---|---|---|---|---|
| | S01 | S02 | S12 | S21 | S22 | S31 | S32 | S33 | S34 | B4 | B10 |
| Viscosity | 36 | 32 | 120 | 70 | 220 | 32 | 135 | 100 | 100 | 125 | 110 |

Example 3

Further tests were carried out for characterization of the partial gelatinization of the cross-linked, cationic and cooked potato and wheat starches. Cooking occurs thereto in a batch cooker with 3% dry solids level. After cooking the composition is diluted to 1% dry solids level, as otherwise no phase separation turns out to occur for potato starches because of too high paste viscosity. 80 g of a starch paste is put into a 100 ml centrifuge vessel and placed into the centrifuge. The centrifuge is operated during 5 minutes at 5000 rpm. The centrifuge is a general purpose Megafuge 1.0 from Heraeus Instruments. Phase separation is observed. The volume of the residue (bottom phase) is measured (in ml). The dry solids content of each phase is measured according to the following procedure. For determination of the dry solids content of the top phase a disposable pipette is dipped into the top phase, until the tip of the pipette is at the 70 ml mark of the centrifuge vessel. Then 3 ml of sample is taken for measurement with a moisture analyzer. For the dry solids determination of the bottom phase, the top phase is first decanted carefully. Thereafter, the remaining bottom phase is mixed. A sample is thereafter taken via spatula and analyzed in the moisture analyzer. Use is made of a moisture analyzer of CEM, type Smart 5. Results are shown in Table 7.

The behavior of the wheat and potato starches turns out to be different, which corresponds to their different gelatinization coefficient as specified above. While the difference in dry solids levels of the two phases is more pronounced for the wheat starch, the mass distribution of over the two phases appears more equal in the wheat starch. The bottom phase of the wheat starch has a dry solids content that is twice as high as that of the potato starches. However, that phase in case of the potato starches is at least 3 times as large as that of the wheat starches. Hence, the majority of the potato starch is primarily present in the bottom phase (approximately 80-90% of the solids and more than 50% of the volume in the bottom phase). The wheat starch is more equally split into two phases (less than 75% of the solids but only 15-20% of the volume in the bottom phase). The insoluble portion of the wheat starch thus is much more compact or less swollen than that of the potato starch. For the wheat starch no significant influence of cross-linking level on either the residue volume, nor on solids increase of the bottom phase was observed. For the potato starch, the residue volume appears inversely dependent on the cross-linking level. This finding for the wheat starch suggests that cross-linking in the wheat starch appears limited to a certain level.

TABLE 7 results of centrifuge experiment to characterize partial gelatinization.

| | S32 | S33 | S34 | S22 | S23 |
|---|---|---|---|---|---|
| ds (paste total | 0.94% | 0.98% | 0.97% | 1.00% | 0.98% |

TABLE 7-continued results of centrifuge experiment to characterize partial gelatinization.

| | S32 | S33 | S34 | S22 | S23 |
|---|---|---|---|---|---|
| ds of top phase | 0.26% | 0.24% | 0.21% | 0.29% | 0.24% |
| ds of bottom phase | 3.08% | 3.1% | 3.31% | 1.56% | 1.63% |
| residue (ml) | 18 | 17 | 14 | 60 | 44 |

Example 4

A further characterization experiment was carried out after cooking at 120° C. In this experiment, the wheat starch S32 was compared with the corn starch S12. The set up of the experiment was identical to that of Example 2. Results are shown in Table 8

TABLE 8 results of second phase separation test

| | S32 | S32 | S12 |
|---|---|---|---|
| temperature | batch cooking | 120° C. | 120° C. |
| ds (paste total | 0.94% | 0.94% | 0.98% |
| ds of top phase | 0.26% | 0.61% | 1.05% |
| ds of bottom phase | 3.08% | 2.27% | 1.03% |
| residue (ml) | 18 | 16 | 0 |
| turbidity of top phase | — | 0.33 | 0.04 |

The results for the corn starch were in accordance with expectation on the basis of microscopic inspection: the corn starch was completely gelatinized. No phase separation could be observed. The increase in cooking temperature results for the wheat starch therein that the phase separation is less sharp: both the volume and the dry solids content of the top phase have increased. The volume and the dry solids content of the bottom phase are reduced. The phase separation however still occurs.

Example 5

Several starches jet cooked at 120° C., 130° C. and 140° C. were applied to paper manufacturing in a concentration of 0.8% based on head box furnish dry solids. The paper was based on a furnish of 71.4% fiber mix, 21.4% coated broke and 7.2% GCC filler and was further diluted with tap water to a concentration of 1%, with in all cases a conductivity of 492 µS/cm, and a furnish charge (SZP)=−24.2 mV. The fiber mix contained 70% short fibers 'eucalyptus' and 30% long fibers 'pine' refined together to 28o SR. The coated broke was obtained from Tullis Russell and contained 24% ash, corresponding to a filler content of 42.7% in the broke The overall filter content was 16.3%. The effective ash content in the furnish was 9.2%. The paper manufacture was done by hand (hand sheet). Sheet formation was done 60 seconds after the addition of the starch to the paper pulp. Measurements were carried out on the White water turbidity (WWT) and the streaming zeta potential (SZP). The White water turbidity was measured as an extinction value in absolute units at 585 nm.

Results are shown in Table 9. An increase in cooking temperature leads to higher white water turbidity and a worse retention for all the starches. The white water turbidity of the wheat starches lies approximately 33% lower than that of other starches. This is particularly true for cooking temperatures of 120° C. and 130° C.

The increase in cooking temperature has also an impact on the charge neutralization achieved with the wheat starches: the lower the cooking temperature, the lower the impact thereon. Due to this lower impact, a higher starch quantity can be added to the paper furnish. This is in striking contrast to the other tested starches, i.e. corn starches and potato starches with low level of cross-linking.

TABLE 9 white water turbidity and ash retention for a set of starches and starch blends with 0.8% starch addition to the paper production.

| starch type | WWT 120° C. | WWT 130° C. | WWT 140° C. | SZP 120° C. | SZP 130° C. | SZP 140-C. |
|---|---|---|---|---|---|---|
| S11 | 0.57 | 0.65 | — | −5 | −4.3 | — |
| S12 | 0.57 | 0.68 | 0.76 | −2.9 | −3.4 | −3.3 |
| S21 | 0.55 | 0.64 | 0.64 | −0.1 | −0.1 | −0.7 |
| S32 | 0.44 | 0.57 | 0.66 | −8.0 | −4.8 | −1.7 |
| S33 | 0.47 | 0.51 | 0.61 | −10.5 | −4.1 | −3.1 |
| S34 | 0.50 | 0.50 | 0.63 | −10.8 | −7.6 | −2.9 |

Example 6

Paper properties of the paper manufactured in accordance with Example 5 were characterized. The strength was measured as the breaking length in km of the paper sheet. The ash retention is indicated relative to the total ash content in the furnish as specified above. The ash content is quantitatively determined by burning a paper sample in an oven at 900° C., at which temperature all organic substances are reduced to CO2 and the calcium carbonate filler is converted to calcium oxide (CaO) and carbon dioxide. Measurements are based on 2 g paper samples that are dried at 140° C. for 20 minutes prior to burning.

It turns out that the breaking length of the wheat starches is lower than that of corn and potato starches. The ash retention is higher for the paper with wheat starch than the other paper sheets. Results are specified in Table 10.

TABLE 10 breaking strength (in km) and ash retention (AR in %) for several starches.

| starch type | Breaking length [km] 120° C. | Breaking length [km] 130° C. | Breaking length [km] 140° C. | AR [%] 120° C. | AR [%] 130° C. | AR [%] 140-C. |
|---|---|---|---|---|---|---|
| S11 | 3.1 | 3.2 | — | 59% | 56% | — |
| S12 | 3.1 | 3.1 | 3.3 | 57% | 54% | 45% |
| S21 | 3.1 | 3.1 | 3.0 | 62% | 55% | 56% |
| S32 | 3.0 | 3.0 | 3.3 | 73% | 62% | 52% |

TABLE 10-continued breaking strength (in km) and ash retention (AR in %) for several starches.

| starch type | Breaking length [km] 120° C. | Breaking length [km] 130° C. | Breaking length [km] 140° C. | AR [%] 120° C. | AR [%] 130° C. | AR [%] 140-C. |
|---|---|---|---|---|---|---|
| S33 | 2.9 | 2.9 | 2.9 | 69% | 65% | 58% |
| S34 | 2.8 | 2.9 | 2.9 | 68% | 66% | 55% |

It is provisionally believed by the inventors on the basis of these results, that the merely partial gelatinization and partial swelling of the wheat starch results therein that a major portion of the cationic groups is hidden within the starch molecule or network, likely present in a helix structure. Only the portion present at the outside of the starch molecule are available for connection to anionic fibers. This leads to less strength improvement. Small anionic fillers in the paper sheet would have a high affinity for the cationic groups and be able to diffuse into the starch molecule, leading to a higher ash retention. With an increase in cooking temperature, the cross-linking may be destroyed resulting in a higher degree of pasting and more available cationic groups. This results in lower ash retention, to a stronger influence on the surface zeta potential and to more interaction with the paper fibers.

Overall, it appears that for the hitherto described wet-end starches the use of lower cross-linking levels and lower cooking temperatures has been beneficial for the paper properties. The wheat starch herein operates in a different way than the other starches; the increased ash retention and likely better ash distribution between the paper fibers can outweight any reduced attraction between the paper fibers and the merely partially gelatinized wheat starch. It may herein be, that the only partially gelatinized and hence primarily swollen wheat starch molecules constitute distance holders between individual paper fibers.

Example 7

A further experiment was carried out with another type of paper. Herein, not merely the type of starch, but also the amount of starch added to the paper furnish was varied. Use was made of starches and starch blends. The starches were all cooked at 120° C.

The starches and starch blends were added to the paper furnish in concentrations of 0.8% and 1.2% based on head box furnish dry solids. The paper was based on a furnish of 71.4% fiber mix, 21.4% coated broke and 7.2% GCC diluted with tap water to a concentration of 0.87% for blends and 0.81% for non-blends, with in all cases a conductivity of 389 µS/cm, and a SZP=−21.4 mV. The overall filler content was again 16.3% and the ash 9.2%. The fiber mix contained 70% short fibers 'eucalyptus' and 30% long fibers 'pine' refined together to 28o SR. The paper manufacture was done by hand (hand sheet). sheet formation was done 60 seconds after the addition of the starch to the paper pulp. Results are shown in Table 11.

The results demonstrate that the white water turbidity for the wheat starches is comparable to those for the cationic cross-linked potato starches. Particularly the addition of more than 0.8% starch to the paper furnish turns out to have very beneficial effects on the white water turbidity. The results with blends of cationic cross-linked wheat and potato starches are very good, in that the white water turbidity is at a level comparable with those of potato starch, but allows that the white water turbidity does substantially not depend on the concentration of the added starch.

The furnish charge, specified in mV, confirms that more than 0.8% starch may be added to the paper furnish without disturbing the balance between positive and negative charges. It appears here particularly, that one may add more starch with increasing cross-linking level. That furthermore matches with the white water turbidity, as a higher starch addition is also beneficial therefore. The experiments with the starch blends confirm that the surface zeta potential is still rather negative when adding 1.2% starch blend. A higher starch loading is therewith enabled. The S34* relates to data on starch S34 with 1.5% loading into the paper furnish. It is apparent from the data that the higher loading improves white water turbidity without giving rise to a positive surface zeta potential.

TABLE 11 white water turbidity (absolute units at 585 nm) and furnish charge (mV) for paper manufacturing in accordance with Example 7

| starch type | white water turbidity 0.8% | white water turbidity 1.2% | furnish charge 0.8% | furnish charge 1.2% |
|---|---|---|---|---|
| S22 | 0.36 | 0.36 | −6.7 | −4.4 |
| S23 | 0.43 | 0.40 | −9.5 | −4.0 |
| S32 | 0.48 | 0.39 | −9.9 | −2.0 |
| S33 | 0.52 | 0.42 | −12.4 | −4.3 |
| S34 | 0.64 | 0.58 | −15.7 | −9.8 |
| S34 * | 0.52 | | −5.0 | |
| B4 | 0.44 | 0.40 | −10.2 | −2.7 |
| B10 | 0.47 | 0.41 | −12.7 | −7.9 |
| B11 | 0.45 | 0.41 | −12.7 | −7.2 |

Results on paper properties, i.e. strength/breaking length (in km) and ash retention (AR in %) are shown in Table 12. Higher loading of the starches generally leads to better paper properties. Particularly surprising are the results for the starch blends as well as the experiment with the 1.5% loading. It can be seen that upon increase of the loading, both the strength and the ash retention are improved. It turns out moreover, through comparison of B10 and B11 that the ratio between wheat starch and potato starch does not have a major impact on the resulting properties.

TABLE 12 breaking strength and retention for a set of starches and starch blends with 0.8% and 1.2% starch addition to the paper production, in accordance with Example 6

| starch type | Breaking length [km] at 0.8% addition | Breaking length [km] at 1.2% addition | AR [%] at 0.8% addition | AR [%] at 1.2% addition |
|---|---|---|---|---|
| S22 | 2.9 | 2.8 | 80% | 80% |
| S23 | 2.6 | 2.7 | 73% | 82% |
| S32 | 2.5 | 2.4 | 73% | 82% |
| S33 | 2.4 | 2.5 | 68% | 75% |
| S34 | 2.5 | 2.6 | 61% | 67% |
| S34* | 2.8 | | 71% | |
| B4 | 2.8 | 3.0 | 72% | 75% |
| B10 | 3.0 | 2.9 | 65% | 74% |
| B11 | 2.7 | 3.0 | 66% | 73% |

Example 8

A further experiment was carried out to measure Anton Paar high shear viscosity, i.e. the viscosity measured at 10,000 rpm. Use was made of spindle 2 at room temperature. For each starch type, the viscosity was determined both after jet cooking at 120° C. (1 minute) and after batch cooking at 96° C. (30 minutes), as specified above. The results show that the behavior of the starches according to the invention is to a certain extent opposite those of potato starch: the Anton Paar viscosity after batch cooking is lower than the Anton Paar viscosity after jet cooking.

TABLE 13 high shear viscosity η for several starches after batch cooking at 96° C. and after jet cooking at 120° C.

| Starch | η after batch cooking | η after jet cooking |
|---|---|---|
| S21 | 36.3 | 23.0 |
| S22 | 50.9 | 29.5 |
| S32 | 7.6 | 17.3 |
| B4 | 10.5 | 18.8 |

Thus, in short, the starch composition of the invention comprises a cationic, cross-linked starch that is partly swollen and partly gelatinized. It preferably has a gelatinization coefficient gT smaller than 0.7 with T the jet cooking temperature. The starch composition suitably comprises a wheat starch or a blend of a wheat starch and another starch, for instance a root or tuber starch.

The invention claimed is:

1. A starch composition comprising:
   a cationic, cross-linked first starch,
   wherein the first starch is partly swollen and partly gelatinized and;
   wherein the starch composition has a gelatinization coefficient gT smaller than 0.7, the gelatinization coefficient being defined according to the formula gT=(ηref−ηjet, T)/(ηref−ηfinal) with ηref being the Brookfield viscosity after batch cooking at 96° C.; ηjet, T being the sample Brookfield viscosity after jet cooking at temperature T; and ηfinal being 40 mPas, wherein all Brookfield viscosities are measured at 3% dry solids, 100 rpm, spindle 2 and 50° C.

2. The composition of claim 1, wherein the starch composition has a gelatinization coefficient gT smaller than 0.6, the gelatinization coefficient being defined according to the formula gT=(ηref−ηjet, T)/(ηref−ηfinal) with ηref being the Brookfield viscosity after batch cooking at 96° C.; ηjet, T being the sample Brookfield viscosity after jet cooking at temperature T of 120° C.; and ηfinal being 40 mPas, wherein all Brookfield viscosities are measured at 3% dry solids, 100 rpm, spindle 2 and 50° C.

3. The composition of claim 1, wherein the first starch comprises a wheat starch.

4. The composition of claim 1, wherein the first starch comprises a wheat starch, wherein the wheat starch has been cross-linked with a diether cross-linker.

5. The composition of claim 1, wherein the first starch comprises a wheat starch, wherein the wheat starch has been cross-linked with a diether cross-linker applied in an amount of 60 to 500 ppm.

6. The composition of claim 1, wherein the first starch comprises a wheat starch, wherein the wheat starch has been cross-linked with a diether cross-linker applied in an amount of 80-400 ppm.

7. The composition of claim 1, wherein the first starch comprises a wheat starch, wherein the wheat starch has been cross-linked with a diether cross-linker applied in an amount of 100-300 ppm.

8. The starch composition of claim 1, wherein the first starch comprises a wheat starch, and wherein the composition further comprises a cooked, cationic, cross-linked second starch, wherein the second starch is different from the wheat starch.

9. The starch composition of claim 1, wherein the first starch comprises a wheat starch and wherein the composition further comprises a cooked, cationic, cross-linked second starch, wherein the second starch is different from the wheat starch, and wherein the second starch is selected from the group consisting of tuber starches, root starches, and mixtures thereof.

10. The starch composition of claim 1, wherein the first starch comprises a wheat starch, wherein the wheat starch is present in an amount of at least 40 wt % based on the total amount of starch.

\* \* \* \* \*